Patented May 26, 1942

2,284,477

UNITED STATES PATENT OFFICE 2,284,477

PREPARATION OF PERACIDS

Joseph S. Reichert, Samuel A. McNeight, and Arthur A. Elston, Niagara Falls, N. Y., assignors to E. I. du Pont de Nemours & Company, Wilmington, Del., a corporation of Delaware No Drawing. Application February 5, 1940, Serial No. 317,318

10 Claims. (Cl. 260—502)

This invention relates to a process for the preparation of peracids and to the novel peracids resulting therefrom. More particularly, it relates to new monoperacids prepared by a novel and improved method.

The monoperacids constitute a class of acids which are chemically characterized by the presence of the perhydroxyl grouping OOH as part of the molecule. The monoperacids may be regarded as derived from other acids, either organic or inorganic, by replacing the hydroxyl group containing the ionizable hydrogen atom of said acids by the perhydroxyl group OOH. Thus, monopersuccinic acid has the chemical constitution

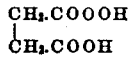

and may be regarded as derived from succinic acid

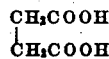

by the replacement of a hydroxyl group containing an ionizable hydrogen atom by the perhydroxyl group.

The invention with which this application is especially concerned involves a process for the preparation of solutions of peracids or their salts, more particularly solutions of monoperacids or salts of monoperacids, by reacting an acid anhydride with a dilute alkaline solution of an inorganic peroxide or persalt. As the inorganic peroxide or persalt we ordinarily prefer to utilize hydrogen peroxide or sodium peroxide, and we have found that the peracids and their salts are produced in very satisfactory yields when the concentration of the peroxide is three volumes of active oxygen or less.

Since the term "volume" or "volume concentration" will be utilized hereinafter in designating the concentration of the inorganic peroxide or persalt utilized, it may be advisable to explain how this term is employed in the art relating to the peroxygen compounds. The volume concentration or volume of a solution of an inorganic peroxide or persalt is the number of cubic centimeters of oxygen gas, measured at 0° C. and a pressure of 760 millimeters of mercury, which will be liberated by 1 cubic centimeter of the solution of the inorganic peroxide or persalt maintained at a temperature of 20° C. The most common of the inorganic peroxides, hydrogen peroxide, is sold commercially in solutions of 100 volume concentration. A solution of hydrogen peroxide of 100 volume concentration contains 30% of $H_2O_2$ by volume and 27.6% of $H_2O_2$ by weight. In converting from volume concentration to percentage of hydrogen peroxide by weight or its equivalent, owing to changes in the density of the solution, a straight line relationship between the two does not exactly exist. A solution of hydrogen peroxide of 2 volume concentration, for example, contains substantially 0.60% $H_2O_2$ by weight. A 3 volume solution of hydrogen peroxide contains 0.91% $H_2O_2$ by weight.

The preparation of solutions of peracids has, in the past, been carried out by reacting relatively concentrated solutions of hydrogen peroxide, solutions of volume concentration greater than about 8 volumes, with various acids and acid anhydrides. The prior art appreciated that solutions of peracids or their salts could be secured by reacting an alkaline solution of hydrogen peroxide of 8 volume concentration or greater with an acid anhydride, but in carrying out this reaction, the temperature was always carefully maintained below room temperature. It is also appreciated in the art that a monoperacid such as monopersuccinic acid could be prepared by reacting succinic anhydride and hydrogen peroxide of relatively high concentration in acid solution, the resulting monopersuccinic acid being produced by hydrolysis, succinic peroxide acid first forming. Thus, while to some extent the art has appreciated that monoperacids, such as monopersuccinic and monoperphthalic, could be prepared by reacting an inorganic peroxide such as hydrogen peroxide and an acid anhydride in either acid or alkaline solution, in all instances it was found necessary to utilize relatively high concentrations of hydrogen peroxide, concentrations much higher than those we employ. And in preparing these monoperacids or their salts, especially when utilizing alkaline solutions, it has previously been necessary to cool the reaction mixture very carefully, the temperature being ordinarily maintained at substantially 0° C. by appropriate cooling means.

We have now found that solutions of monoperacids and their salts may be readily prepared by reacting an acid anhydride and an inorganic peroxide or persalt equivalent in action to that of hydrogen peroxide at any temperature up to 180° F., and that no special care is necessary to maintain the reaction mixture relatively cool in order that yields approaching the quantitative may be secured. We have found, however, that in order to produce solutions of monoperacids and their salts in substantial yield and without cooling, it is necessary to employ very dilute solutions of the inorganic peroxide or persalt, solutions of 3 volume concentration or less. When employing hydrogen peroxide as the inorganic peroxide, in terms of percentage concentration, we have found that a solution of not over about 0.91% hydrogen peroxide concentration (this percentage being by weight) equivalent to a 3 volume solution, must be employed in order that the yield of the resulting monoperacid or the sodium or other alkali metal salt of the monoperacid may approach quantitative yields.

It is indeed surprising that peracids and their salts will form in satisfactory yields when utilizing active oxygen-yielding reagents in such very dilute concentrations, especially since when utilizing fairly concentrated solutions of peroxides, solutions of eight volume or greater, the yields of peracids and their salts are unsatisfactorily low when the reaction is carried out under alkaline conditions.

Ordinarily we employ solutions of inorganic peroxides of much less than 3 volume concentration, in some cases the volume concentration of the peroxide solution being as low as 0.0125 volume or lower. Solutions of this volume concentration are extremely dilute, this concentration corresponding, for example, to 0.0038% $H_2O_2$ by weight.

It was not to be expected that reducing the peroxide concentration to relatively low values would result in satisfactory conversion of the inorganic peroxide and acid anhydride to the monoperacid, as diluting the solution containing the peroxide would be expected to decrease the conversion. It will be appreciated that when an acid anhydride is added to an aqueous solution of a peroxide, there are two reactions possible. The acid may form by reaction of the anhydride with water, or the peracid may form by reaction of the anhydride with hydrogen peroxide or other inorganic peroxide. Increasing the ratio of water to hydrogen peroxide by diluting the peroxide solution would be expected to favor the first reaction and to result in greater conversion of the acid anhydride to the acid. Surprisingly enough, if the solution is maintained alkaline, especially if the alkalinity of the solution is greater than that equivalent to a pH of about 10.0, it has been found that the conversion of the anhydride to the monoperacid or the salt of the monoperacid is favored. We have secured yields substantially approaching the theoretical, 85% conversion or over, when this condition of alkalinity is maintained, starting with very dilute solutions of the peroxides.

Accordingly, one of the objects of this invention is to prepare solutions of peracids and their salts from relatively dilute solutions of inorganic peroxides. More particularly, this object comprises preparing a solution of a monoperacid or a solution of a salt of a monoperacid, preferably an alkali metal salt of the peracid, by reacting relatively dilute solutions of inorganic peroxides or persalts with acid anhydrides under alkaline conditions.

Other objects of this invention involve the development of a process for producing the monoperacids and their salts in substantially quantitative yield by means of a simple, direct process requiring no careful and exacting control of temperature, time, pH, or concentration. This object is effected by utilizing relatively dilute solutions of inorganic peroxides or persalts, solutions of 3 volume concentration or less, and insuring alkaline conditions by utilizing an initial pH of the reaction mixture of 10.0 or above. In developing a process that requires no cooling and no accurate observation of times, concentrations, or other conditions, this process constitutes a distinct contribution to the art of manufacturing peracids and their salts. The peracid solutions produced in this way are directly available for use in various bleaching and other operations, and require no further treatment before utilizing them for various important commercial purposes.

The monoperacids, with which this invention is concerned, may be regarded as derived from other acids by replacing the hydroxyl group containing the ionizable hydrogen atom of those acids by the perhydroxyl group OOH. As acids from which the monoperacids may be derived in this way, may be mentioned organic acids of various classes, such as carboxylic organic acids; hydroxy organic acids; and saturated or unsaturated acids, whether those acids be aliphatic or aromatic. Organic acids not characterized by the presence of a carboxyl group, such as sulfonic acids, either aliphatic or aromatic, may also be mentioned. Acids derived from heterocyclic compounds, such as furoic acid, are included.

Among aliphatic acids from which monoperacids or their salts may be prepared in accordance with our process by reacting the acid anhydride and an inorganic peroxide, may be mentioned monobasic acids, such as acetic acid, and dibasic acids, such as succinic acid. The monoperacids may be regarded as derived from these aliphatic acids by replacement of the hydroxyl group by the perhydroxyl group. Among hydroxy acids yielding monoperacids, preparable in accordance with our method by reacting the acid anhydride and an inorganic peroxide, may be specified acids such as glycolic acid. Unsaturated aliphatic dibasic acids, such as maleic acid, may also be specified.

Among aromatic acids may be mentioned benzoic acid, this acid yielding monoperbenzoic acid by replacement of the hydroxyl group containing the ionizable hydrogen atom by the perhydroxyl group. Among other aromatic acids may be mentioned monoperphthalic acid, derivable from phthalic acid. Monoperphthalic acid and the monoperphthalates are readily prepared in accordance with our process wherein a dilute solution of an inorganic peroxide is reacted with phthalic anhydride, the initial pH of the inorganic peroxide solution to which the anhydride is added being 10.0 or above. Alicyclic organic acids, such as cyclohexane carboxylic acid, may also be utilized to prepare monoperacids in accordance with our process.

Among sulfonic acids from which the monoperacids and their salts may be prepared may be mentioned acids such as benzene sulfonic acid. Among heterocyclic acids, nicotinic and quinolinic acids are to be considered.

Our process for preparing the monoperacids and their salts may be carried out by first preparing a solution of an inorganic peroxide of the desired concentration and alkalinity. Ordinarily hydrogen peroxide, or some alkali metal peroxide such as sodium peroxide, is utilized. The concentration of the peroxide should be such that the concentration of the reaction mixture does not exceed about 3 volumes (not exceeding an amount equivalent to 0.91% $H_2O_2$ by weight). The alkalinity of the mixture should be carefully regulated, by the addition of acid (if it should be required) or of an alkali such as caustic soda, as required, so that the pH is 10.0 or above. When utilizing an alkali metal peroxide, such as sodium peroxide, or alkali metal perborate such as sodium perborate, no addition to control the pH is ordinarily necessary. There is then dissolved in the solution of the active oxygen yielding compound the particular acid anhydride selected, this acid anhydride being ordinarily added in equimolar amount.

The reaction is not quite instantaneous, but is complete at the end of two or three minutes, varying to some slight extent with temperature. However, it is not necessary to control the temperature, and we have found temperatures ranging anywhere from room temperature (70° F. or below to 180° F.) to be quite satisfactory. The particular alkali used to control the initial pH of the reaction mixture (where it is necessary to add an alkali) is not of importance, and we have found satisfactory conversion of the acid anhydride to the monoperacid when the alkali employed is caustic soda, tetrasodium pyrophosphate, trisodium phosphate, borax, sodium silicate, soap, or other alkali.

As examples of our improved process for preparing monoperacids and their salts in solution, the following may be given.

Example I

To 1 liter of a solution of sodium peroxide of 0.25 volume concentration (equivalent to approximately 0.076% $H_2O_2$ by weight) there were added 5.5 grams of phthalic anhydride. The temperature was 120° F. and the pH of the peroxide solution, before addition of the phthalic anhydride, was 11.6, and required the addition of no alkali for adjustment. The mixture was stirred, and at the end of five minutes, analysis showed that 83.7% of the active oxygen initially present had been converted to the monoperphthalic acid form.

Example II

To 1 liter of a solution of sodium peroxide of 0.25 volume concentration (equivalent to 0.076% $H_2O_2$ by weight) there were added 3.5 grams of phthalic anhydride. The temperature was 120° F. and the pH was 11.6. At the end of five minutes, analysis showed that 67.4% of the active oxygen present had been converted to the form of monoperphthalic acid.

Example III

To 1 liter of a solution of sodium peroxide of 0.0125 volume concentration (equivalent to 0.0038% $H_2O_2$ by weight) there was added 0.17 gram of phthalic anhydride. The temperature was 120° F. and the pH was 11.6. At the end of five minutes, analysis showed that 49.9% of the active oxygen initially present had been converted to the form of monoperphthalic acid.

Example IV

To several solutions of sodium perborate of 0.025 volume concentration (equivalent to 0.0076% $H_2O_2$ by weight) at different temperatures and at a pH of 10.2 there was added an equimolar amount of succinic anhydride. The percentages of active oxygen converted to monopersuccinic acid are shown in the following table:

| Temperature | Percent conversion |
| --- | --- |
| ° F. | |
| 90 | 72.6 |
| 120 | 71.8 |
| 150 | 65.0 |
| 180 | 64.2 |

It is evident that the percentage of conversion is practically independent of the temperature employed within the range 90 to 180° F., and that good conversion of the succinic anhydride to the monopersuccinic acid form was secured in all cases.

Example V

A series of trials similar to those given in Example IV was carried out utilizing sodium perborate solution containing an amount of sodium hydroxide such that after the addition of an equimolar amount of succinic anhydride the pH was approximately 8.9. Before addition of the succinic anhydride the pH of the perborate solution containing caustic soda was 11.5. The percentage of succinic anhydride converted to monopersuccinic acid at the various temperatures employed is shown in the following table:

| Temperature | Percent conversion |
| --- | --- |
| ° F. | |
| 90 | 82.0 |
| 120 | 79.4 |
| 150 | 67.6 |
| 180 | 65.4 |

It is apparent that with the somewhat higher pH here maintained, the percentage conversion was but slightly higher than in Example IV in every case. Good yields of the sodium salt of monopersuccinic acid were secured, regardless of the temperature prevailing during the reaction.

Example VI

To a solution of sodium perborate of 1.0 volume concentration (equivalent to 0.30% $H_2O_2$ by weight) there was added an equimolar amount of succinic anhydride. The temperature was 120° F., and the pH of the sodium perborate solution, before addition of the succinic anhydride, was 10.2. At the end of three minutes the anhydride was found to be converted to the monopersuccinic acid form to the extent of 83.0%.

Example VII

To a solution of sodium peroxide of 0.25 volume concentration (equivalent to 0.076% $H_2O_2$ by weight) at 90° F. and at a pH of 11.6 there was added an equimolar amount of acetic anhydride. At the end of three minutes, it was found that the anhydride had been converted to monoperacetic acid to the extent of 85.8%.

Example VIII

A solution of hydrogen peroxide of 1 volume concentration (0.30% $H_2O_2$ by weight) was reacted with acetic anhydride at various pH values. The pH of the peroxide solution, before addition of the anhydride, was adjusted in each case by the addition of caustic soda. The following table gives the percent conversion to monoperacetic acid when solutions of hydrogen peroxide of several pH values were employed as the reagent.

| pH of hydrogen peroxide solution before addition of acetic anhydride | Percent conversion to peracetate |
| --- | --- |
| 6.2 | 0.0 |
| 9.8 | 9.7 |
| 10.0 | 10.1 |
| 10.1 | 18.1 |
| 10.2 | 25.3 |
| 10.4 | 27.8 |
| 10.5 | 35.8 |
| 10.8 | 71.1 |
| 10.9 | 88.4 |
| 11.1 | 88.6 |

It is apparent that pH values as low as one, corresponding approximately to neutrality (6.2) do not result in any substantial conversion of the acetic anhydride to peracetic acid. As the pH increases to one approximating 10.0, or higher, the percentage conversion increases to very satisfactory yields, the conversion when the pH is about 11.0 being 88%, i. e. practically quantitative conversion. At a pH value of 10.0, while the percentage conversion measured quantitatively is not very great, solutions converted to the peracetic form to the extent of only 10% may be fully as satisfactory for various commercial purposes as solutions in which the acetic anhydride has been converted substantially completely to the peracetate form.

Example IX

To 450 cc. of water in which had been dissolved 2.49 grams of sodium perborate monohydrate, there were added 2.45 grams of maleic anhydride. The temperature was approximately 83° F. and the pH, before addition of the maleic anhydride, was 10.2. After several minutes the solution was analyzed to determine the percentage conversion to monopermaleic acid, and it was found that 43% of the active oxygen had been converted to the monopermaleic acid form.

Example X

To 1 liter of an aqueous solution containing 0.92 gram of sodium perborate monohydrate there was added 1.03 grams of glutaric anhydride. The temperature was approximately 90° F. and the pH of the solution before addition of the anhydride was 10.2. After an interval of ten minutes, the solution was analyzed and 68.0% of the active oxygen originally present was found to be in the form of monoperglutaric acid.

In carrying out our improved process for the manufacture of monoperacids and their salts from relatively dilute solutions of inorganic peroxides and acid anhydrides under conditions wherein the pH of the solution is 10.0 or above, we have found that various inorganic peroxygen compounds may be utilized with entire success. Thus, we may utilize hydrogen peroxide, the alkali metal peroxides such as sodium peroxide, or the alkali earth metal perborates such as sodium perborate. Other peroxygen salts which are not now available commercially in large amounts may, however, be utilized with entire success, such as the alkali metal perphosphates, the alkali metal percarbonates, the alkali metal persulfates, etc. In general, any peroxygen compound equivalent in aqueous solution to an alkaline solution of hydrogen peroxide may be utilized.

Any acid anhydride, particularly acid anhydrides of organic acids of the various classes previously specified, may be utilized in our process. Our preferred acid anhydrides in practicing our process are, however, phthalic anhydride, acetic anhydride, succinic anhydride, and maleic anhydride, yielding respectively monoperphthalic acid, peracetic acid, monopersuccinic acid, monopermaleic acid, or the corresponding alkali metal salts of these acids.

When an alkalizing agent is needed to adjust the pH of the peroxide solution before addition of the acid anhydride to 10.0 or above, ordinarily we prefer to employ caustic soda (NaOH). When utilizing peroxygen compounds such as sodium peroxide or sodium perborate, ordinarily there is sufficient alkali present to insure a pH above the critical value. When utilizing hydrogen peroxide, however, or if it is desired to adjust the pH in cases wherein the other specified inorganic peroxygen compounds are utilized, we may utilize any of the various alkalizing agents previously specified, or others, as desired.

As various changes might be made in our process without departing from the spirit of our invention, that invention should not be restricted to precise details and conditions, except as necessitated by the appended claims and the prior art.

We claim:

1. The process for preparing a member of the group consisting of peracids and their alkali metal salts which comprises reacting the anhydride of a carboxylic acid and an alkaline solution of a dilute inorganic peroxygen compound, said alkaline solution having a pH of at least 10.0 and a concentration not exceeding 3.0 volumes.

2. The process for preparing a member of the group consisting of peracids and their alkali metal salts which comprises reacting an alkaline solution of a dilute inorganic peroxide having a pH of at least 10.0 and the anhydride of a carboxylic acid, said alkaline solution of said inorganic peroxide having a concentration not exceeding 3 volumes.

3. The process for preparing a member of the group consisting of peracids and their alkali metal salts which comprises reacting an alkaline solution of dilute hydrogen peroxide having a pH of at least 10.0 and the anhydride of a carboxylic acid, said alkaline solution of hydrogen peroxide having a concentration not exceeding 3 volumes.

4. The process for preparing a member of the group consisting of peracids and their alkali metal salts which comprises reacting, in aqueous solution, the anhydride of a carboxylic acid and an alkaline solution of an inorganic peroxygen compound having an active oxygen concentration not exceeding that equivalent to three volume hydrogen peroxide solution, said alkaline solution having a pH of at least 10.0.

5. The process for preparing a member of the group which consists of organic peracids and their alkali metal salts which comprises reacting the anhydride of a carboxylic acid and an alkaline solution of an alkali metal peroxide, said solution having a pH of at least 10.0 and a peroxide concentration not exceeding 3 volumes.

6. The process for preparing a member of the group which consists of organic peracids and their alkali metal salts which comprises reacting the anhydride of a carboxylic acid and a solution of an alkali metal perborate, said solution of said alkali metal perborate having a pH of at least 10.0 and a perborate concentration not exceeding 3 volumes.

7. The process for preparing a member of the group which consists of organic peracids and their alkali metal salts which comprises reacting, in aqueous solution, the anhydride of a carboxylic acid and a solution of sodium peroxide, said solution of sodium peroxide having a pH of at least 10.0 and containing sodium peroxide in amount not substantially in excess of that equivalent to a 3 volume solution.

8. The process for preparing a member of the group which consists of organic peracids and their alkali metal salts which comprises reacting, in aqueous solution, the anhydride of a carboxylic acid and a solution of sodium perborate, said solution of sodium perborate having a pH of at least 10.0 and containing perborate in amount not substantially in excess of that equivalent to a solution of 3 volume concentration.

9. The process for preparing a member of the group which consists of organic peracids and their alkali metal salts which comprises reacting the anhydride of an organic acid selected from the group which consists of acetic anhydride, phthalic anhydride, succinic anhydride and maleic anhydride, with an aqueous solution of an inorganic peroxygen compound, said solution of said peroxygen compound having a pH of at least 10.0 and a concentration not substantially in excess of that equivalent to 3 volumes.

10. The process for preparing a member of the group which consists of organic peracids and their alkali metal salts which comprises reacting the anhydride of an organic acid selected from the group which consists of acetic anhydride, phthalic anhydride, succinic anhydride, and maleic anhydride, with an aqueous solution of an inorganic peroxygen compound, said aqueous solution of said peroxygen compound having a pH of at least 10.0 and a concentration not substantially in excess of that equivalent to 3 volumes.

JOSEPH S. REICHERT.
SAMUEL A. McNEIGHT.
ARTHUR A. ELSTON.